United States Patent Office 2,887,850
Patented May 26, 1959

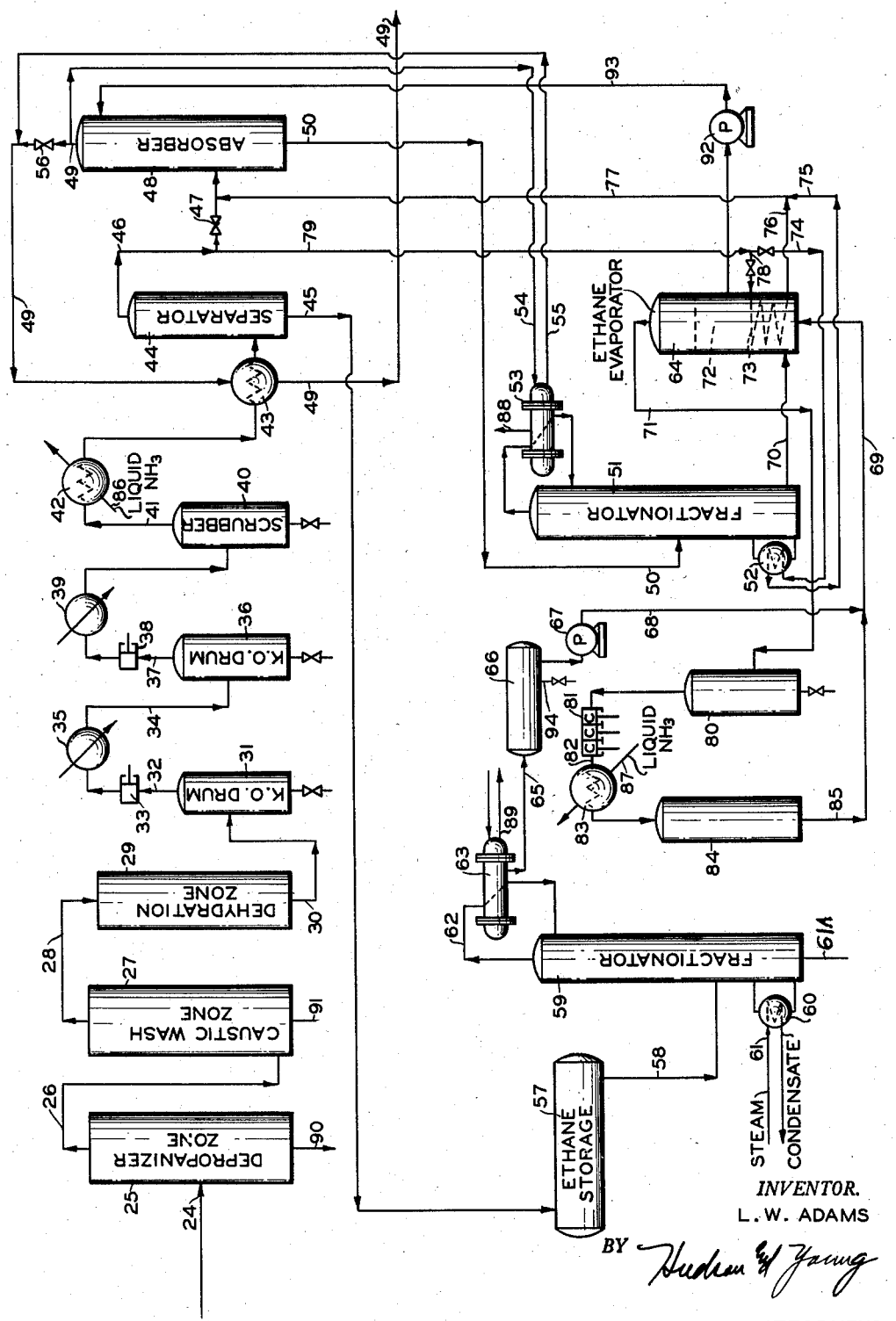

2,887,850

METHANE SEPARATED FROM HYDROGEN USING ETHANE AS AN ABSORBENT

Loyd W. Adams, Bartlesville, Okla., assignor to Phillips Petroleum Company, a corporation of Delaware Application December 19, 1955, Serial No. 553,859

8 Claims. (Cl. 62—17)

This invention relates to separation of methane from mixtures of methane with hydrogen. In one aspect it relates to a method for increasing the hydrogen content of hydrogen containing gases containing minor amounts of normal gaseous hydrocarbons.

Prior art discloses separation of hydrocarbons from other gases by absorption methods wherein the absorbent is ordinarily a liquid of relatively low volatility at absorption and at stripping temperatures. Some prior art methods employ absorbents having a molecular weight of about 150 as the lowest limit because absorbents of molecular weights less than 150 are considered, in general, too volatile because appreciable quantities of absorbent are lost in the off gases from the absorber and in the stripper overhead.

Other prior art is directed to separation of, for example, constituents of air from one another and for separation of such materials as nitrogen and methane from mixtures with hydrogen by fractional condensation methods. Such methods require extremely low refrigeration temperatures and products produced are frequently far from pure. Increasing the concentration of a constituent in a gas for example from 50 to 80% is in many cases a relatively simple matter. However, increasing the concentration of a constituent from, for example, 90% to around 98–99% exhibits a markedly different and more difficult problem. According to my invention, I have devised a process which is adapted to concentrate, for example, hydrogen from a charge gas containing about 90 mol percent hydrogen to a concentration greater than 99%. I find that by applying the principles of absorption with a volatile absorbent at high pressure and low temperatures, a substantial portion of the low temperature required being obtained through evaporation of the absorbent and I am able to obtain the aforementioned increase in the concentration of hydrogen.

I have devised a method for concentrating hydrogen comprising contacting a charge stock containing hydrogen and minor amounts of normally gaseous hydrocarbons with a lean liquid absorbent selected from the group consisting of ethane, ethylene, propane and propylene, from the contacting operation withdrawing treated hydrogen having a higher hydrogen concentration than the hydrogen concentration of said charge stock as the main product of the operation, also withdrawing rich liquid absorbent from said operation, fractionating this withdrawn rich liquid absorbent to produce an overhead product comprising methane and a kettle product comprising said liquid absorbent, and passing at least a portion of said kettle product to the original contacting operation as said lean liquid absorbent.

An object of my invention is to provide a process for increasing the concentration of gaseous hydrogen in gaseous mixtures already containing relatively high concentrations of hydrogen.

Another object of my invention is to provide such a process for processing large volumes of hydrogen.

Yet another object of my invention is to provide such a process for the concentration of hydrogen requiring a minimum of utility requirements.

Still other objects and advantages of my process will be realized upon reading the following description taken with the attached drawing and forming a part of this specification.

In the drawing, the figure represents, in diagrammatic form, an arrangement of apparatus parts for practicing the process of my invention. Referring to the drawing a charge gas having concentrations of approximately 90% hydrogen and 3.6% methane with smaller amounts of higher boiling hydrocarbons is depropanized in a depropanizing operation illustrated diagrammatically as depropanizer zone 25. This charge stock can originate from a hydrocarbon cracking operation, from a platforming operation or from any other suitable source and is passed through a pipe 24 from a source, not shown, into depropanizer zone 25. In this depropanizing zone substantial amounts of propane and higher boiling hydrocarbons are removed while only small amounts of methane and ethane are removed. The depropanized gaseous charge material leaves depropanizer 25 through a pipe 26 and is passed to a caustic wash zone 27 which is intended to remove hydrogen sulfide which survived the depropanizing operation. The depropanized and $H_2S$-free charge gas leaves the caustic wash zone 27 through a pipe 28 and is passed therefrom into a dehydration zone 29, such as bauxite dehydrator. Dehydrator 29 is intended to remove moisture originally in the charge gas as well as moisture introduced thereinto in the hydrogen sulfide removing operation.

Dry charge gas is then passed from zone 29 through a pipe 30 into a small knock out tank 31 and gas leaving this tank through a pipe 32 is compressed in compressor 33 the compressed gas being cooled in a heat exchanger 35 by heat exchange with plant water and the so-cooled gas is passed through pipe 34 into a separator or knock out tank 36. This separator tank 36 can, if desired, be called a knock out drum and it is intended that any condensate formed by compressor 33 and condenser 35 should be separated therein. Gases separated in knock out drum 36 are passed through a pipe 37 and are compressed in compressor 38 to approximately 5,300 pounds per square inch. This highly compressed gas is cooled in a heat exchanger 39 by plant cooling water to about 100° F. This compressed and cooled gas is then passed into a scrubber 40 which is provided with baffles for mist extraction. Gases therefrom are passed on through pipe 41 and through a heat exchanger 42 which is cooled by indirect heat exchange with liquid ammonia from a pipe 86 to a temperature of about 30° F. This so-cooled gas is further cooled in exchanger 43 by heat exchange with a gaseous product, subsequently produced, to a temperature of about −40° F. During these several heat exchange steps and passage through pipe 41, the pressure of a gas drops from the aforementioned 5,300 pounds per square inch to about 5,220 pounds per square inch. The gaseous material at this latter pressure and at −40° F. is passed into a separator 44 in which an appreciable quantity of condensate separates from uncondensed gases. The condensate comprises largely ethane along with minor amounts of hydrocarbons not separated in the aforementioned depropanizing operation. This ethane containing material is passed from separator 44 through a pipe 45 into an ethane storage or run tank 57. Liquid ethane is passed from this run tank through a pipe 58 into a fractionator 59 which is operated as a deoiler for removal of substantially all components boiling at a higher temperature than ethane. Steam for reboiling this deoiler is supplied in reboiler 61 while kettle product is removed through a pipe 61A for such disposal as desired. Overhead product comprising substantially ethane is removed from the fractionator through a pipe 62 and is condensed by heat exchange with refrigerant ammonia in a reflux condenser 63, the ammonia being conveyed in a pipe 89 from and to a source, not shown. An amount of condensed ethane required for refluxing fractionator 59 is returned thereto as reflux and the remainder is passed through a pipe 65 to an absorbent run tank 66. Liquid ethane from tank 66 is charged by a pump 67 through a pipe 68 and a pipe 69 into an ethane evaporator tank 64. Liquid ethane from tank 64 is pumped by a pump 92 through a pipe 93 and is added to the absorber 48 as absorbent.

Under some conditions gases separated in separator tank 44 are passed through pipe 46 with valve 47 being opened into the lower portion of the absorber 48 in which methane in the gas charge material is absorbed by the downflowing liquid ethane introduced through pipe 93 as just mentioned. This absorption operation is carried out at a pressure not substantially lower than the aforementioned 5,220 pounds and at a temperature of about —120° F., to be explained hereinafter.

Rich absorbent ethane charged with dissolved methane is withdrawn from absorber 48 through a pipe 50 and is passed into an ethane fractionator 51 in which the dissolved methane is fractionated from the absorbent. The methane leaves fractionator 51 through an overhead pipe and is heat exchanged with a material subsequently described to produce sufficient liquid methane for refluxing the fractionator 51. The condensate so produced in the reflux condenser 53 is passed into fractionator 51 to reflux same while uncondensed gas is vented through a pipe 88 and can be used for whatever purpose desired since this gas consists largely of methane and contains some hydrogen.

The effluent hydrogen gas from absorber 48 is removed therefrom via a pipe 49 and is passed therethrough as the main product of the process to subsequent use as desired. Since this absorber is operated at the aforementioned —120° F., the overhead gases possess this very low temperature and upon closing a valve 56 this gaseous product is passed through a pipe 54 to the aforementioned reflux condenser 53 for producing reflux for the fractionator 51. The heat exchanged gas from the reflux condenser is returned through a pipe 55 to pipe 49 on the side of valve 56 opposite the absorber 48. This gas still possesses a relatively low temperature and is used in at least one of the heat exchange steps for cooling the charge to the process. This cold gas is heat exchanged with the charge gas in the aforementioned heat exchanger 43 and therein cools the charge gases from 30° F. to —40° F.

In such a low temperature absorption operation as carried out in absorber 48, it is ordinarily advisable to cool the gases undergoing absorption as well as the lean absorbent prior to their introduction to the absorber. Such cooling is especially advisable because absorption of gases in liquids is exothermic and heating results in a decrease in the absorption activity of the absorbent. Thus in order to cool further the charge gas to the absorber the charge gas flowing through pipe 46 is passed through pipe 79, with valve 47 in pipe 46 being closed, and through a pipe 78 into the ethane evaporator tank 64 in which the gas is indirectly heat exchanged with evaporating ethane thereby markedly cooling the charge gas.

Reference numeral 73 identifies a coil through which this charge gas is passed in indirect heat exchange with the evaporating ethane. From this coil the so-chilled charge gas is passed through a pipe 76 and is returned via pipe 77 to pipe 46 on the side of valve 47 adjacent the absorber 48. The charge gas is thus cooled from about —40° F. to about —100° F. on passing in indirect heat exchange to the evaporating ethane in the tank 64. A sufficient amount of this charge gas flowing through pipe 79 is by-passed from pipe 78 and flows through a pipe 74 to provide reboiling heat in reboiler 52 for reboiling the ethane fractionator 51. On providing reboiling heat for this ethane fractionator the charge gas is further cooled and the so-cooled gas is removed from the reboiler and is passed through a pipe 75 and is added to the charge gas in pipe 76, with the combined streams of gas flowing through pipe 77 and pipe 46 into the absorber.

The proportion of the charge gas flowing through pipe 79 required for reboiling the ethane fractionator can be adjusted by proper adjustment of the valves in the several lines carrying this gas.

The liquid ethane bottoms from the ethane fractionator 51 substantially free of methane is passed through a pipe 70 into the ethane evaporator tank 64. This ethane passing through pipe 70 is, of course, recycle ethane since it has been through the absorber at least once. Liquid ethane from the evaporator tank 64 is passed under the influence of pump 92 through pipe 93 as absorbent to the absorber 48.

As mentioned hereinbefore tank 64 is an ethane evaporator tank and at least a portion of the liquid ethane 72 in this tank is evaporated and the vapors are passed through a pipe 71 to a suction scrubber tank 80 which is provided with baffle plates for removing mist. Ethane gas, free from mist, is removed from the suction scrubber 80 and is compressed in compressor 81, for example, a three-stage compressor, to about 400 pounds per square inch pressure and the ethane at this pressure is passed through a pipe 82 to a heat exchanger 83 in which the compressed ethane is heat exchanged with refrigerant liquid ammonia from pipe 87 and coming from a source, not shown. The compressed ethane is cooled in exchanger 83 to a temperature of about 30° F. and the thus cooled ethane is passed into a run tank 84. This heat exchange operation with liquid ammonia in heat exchanger 83 is intended to condense substantially completely all of the ethane so that only liquid ethane enters the accumulator tank 84. The liquid ethane from this tank passes on through pipes 85 and 69 to the ethane evaporator 64 as recycle ethane. Obviously the ethane entering tank 64 from the source just mentioned is that ethane which was previously evaporated in tank 64 for providing refrigeration for cooling charge stock to the absorption process and for cooling absorbent ethane prior to its introduction into the absorber.

A pipe 94 is connected with tank 66 for withdrawal of liquid ethane in case more liquid ethane is produced in the process than is required for the refrigeration and for the absorption operation.

The following tabulation illustrates a working example of the composition of a representative charge stock to my absorption process wherein the compositions listed under heading 24 is the composition of the gas being charged to the depropanizer 25. The composition given under heading 26 is the composition of the gas following the depropanizing operation. The composition given under heading 49 is the composition of a final hydrogen-rich gas produced according to my invention.

It is noted that the depropanizing operation increases the concentration of hydrogen from 90% to 95% while the absorption step increases the concentration still further to 99.3%, which percentage composition is extremely high for such an industrial product. It is further noted that a methane content of the final gas is only 0.5% and the concentration of ethane which is used as the absorbent in the operation is only 0.2%. These percentages are molecular percentages.

| Mol percent | (24) | (26) | (49) | (90) |
|---|---|---|---|---|
| $H_2$ | 90 | 95.0 | 99.3 | |
| $CH_4$ | 3.6 | 3.2 | 0.5 | |
| $C_2H_6$ | 2.6 | 1.2 | 0.2 | |
| $C_3H_8$ | 1.5 ($C_3+$) | .6 | | 7,800 |
| $C_4H_{10}$ | .9 | | | 5,100 |
| $C_{5+}$ | .6 | | | 1,590 |
| $H_2S$ | 2–6 | 2–6 | | |
| Gr. per 100 Cu. Ft. Pressure lbs. gauge | | 400 | 970 | |
| Temp., °F | | 90 | | |

A pipe 90 is for passage of the propane-rich material separated in depropanizer 25 and this material has a composition indicated in column headed by numeral 90. The composition under heading 90 is given in gallons per day based on a charge of 7 million standard cubic feet per day (s.c.f.d) of gas to the process.

Conduit 91 is provided in conjunction with the hydrogen sulfide washer 27 for addition of reagent and for removal of spent reagent from this operation.

While I have explained the operation of my process using liquid ethane as the absorbent for the methane in the absorber, I do not wish to limit my invention thereto because propane, propylene and ethylene can be used in the absorption operation. When using these latter mentioned hydrocarbons as absorbents, it will be obvious to those skilled in the art that the temperatures and pressures involved in the operation will need to be modified accordingly.

However, while these latter mentioned hydrocarbons are satisfactory for use in the process under some conditions, I prefer to use liquid ethane as the absorbent.

Ethylene can be used to absorb methane efficiently from mixtures with hydrogen but is more expensive than ethane. Propane and propylene can be used at pressures slightly below atmospheric in the evaporator or flash tank 64, pressures being 1 to 2 pounds below atmospheric. Butane and butylene are not satisfactory because flashing in tank 64 has to be at pressures materially below atmospheric, and maintenance of vacuum flashing conditions are costly. Operating at pressures below atmospheric also increases chances of contamination of the refrigerant hydrocarbon or hydrogen with atmospheric oxygen which present a hazard. The use of higher boiling hydrocarbons and propane are disadvantageous and their use is not recommended for best operation of our process. As mentioned hereinabove, I prefer to use ethane as the refrigerant.

While certain embodiments of the invention have been described for illustrative purposes, the invention obviously is not limited thereto.

I claim:

1. A method for concentrating hydrogen comprising contacting a charge stock containing hydrogen and minor amounts of normally gaseous hydrocarbons with a lean liquid absorbent selected from the group consisting of ethane, ethylene, propane and propylene at a superatmospheric pressure and subatmospheric temperature, from this contacting operation withdrawing a contacted stream of gas having a greater hydrogen content than said charge stock as the main product of the operation, also withdrawing rich liquid absorbent from said operation, fractionating this withdrawn rich liquid absorbent at substantially said superatmospheric pressure to produce an overhead product comprising methane and a kettle product comprising said lean liquid absorbent, chilling said kettle product comprising said liquid absorbent by evaporating a portion thereof, and passing the remaining and chilled portion of said kettle product to the original contacting operation as the first mentioned lean liquid absorbent.

2. A method for concentrating hydrogen comprising contacting a charge stock containing hydrogen and minor amounts of normally gaseous hydrocarbons with a lean liquid absorbent selected from the group consisting of liquid ethane, liquid ethylene, liquid propane and liquid propylene at a superatmospheric pressure and subatmospheric temperature, from this contacting operation withdrawing a contacted stream of gas having a greater hydrogen content than said charge stock as the main product of the operation, also withdrawing rich liquid absorbent from said operation, fractionating this withdrawn rich liquid absorbent at substantially said superatmospheric pressure to produce an overhead product comprising methane and a kettle product comprising said lean liquid absorbent, chilling said kettle product comprising said liquid absorbent by evaporating a portion thereof, chilling said charge stock to said subatmospheric temperature by indirect heat exchange of said charge stock with the chilled kettle product, and passing the remaining and chilled portion of said kettle product to the original contacting operation as the first mentioned lean liquid absorbent.

3. A method for concentrating hydrogen comprising contacting a charge stock containing hydrogen and minor amounts of normally gaseous hydrocarbons with a lean liquid absorbent selected from the group consisting of liquid ethane, liquid ethylene, liquid propane and liquid propylene, at a superatmospheric pressure and subatmospheric temperature, from this contacting operation withdrawing a contacted stream of gas having a greater hydrogen content than said charge stock as the main product of the operation, also withdrawing rich liquid absorbent from said operation, fractionating this withdrawn rich liquid absorbent at substantially said superatmospheric pressure to produce an overhead product comprising methane and a kettle product comprising said lean liquid absorbent, chilling said charge stock to said subatmospheric temperature by indirectly heat exchanging said charge stock with the kettle contents of the fractionating operation whereby reboiling heat is provided to promote fractionating of said rich liquid absorbent.

4. A method for concentrating hydrogen comprising contacting a charge stock containing hydrogen and minor amounts of normally gaseous hydrocarbons with a lean liquid absorbent selected from the group consisting of ethane, ethylene, propane and propylene, at a superatmospheric pressure and subatmospheric temperature, from this contacting operation withdrawing a contacted stream of gas having a greater hydrogen content than said charge stock as the main product of the operation, also withdrawing rich liquid absorbent from said operation, fractionating this withdrawn rich liquid absorbent at substantially said superatmospheric pressure to produce an overhead product comprising methane and a kettle product comprising said lean liquid absorbent, passing at least a portion of said kettle product to the original contacting step as the first mentioned lean liquid absorbent, heat exchanging said overhead product comprising methane with the withdrawn contacted hydrogen of the contacting operation, and adding the heat exchanged overhead product into the fractionating operation as reflux.

5. A method for concentrating hydrogen comprising chilling a charge stock containing hydrogen and minor amounts of normally gaseous hydrocarbons to a subatmospheric temperature at a superatmospheric pressure to produce condensate, separating said condensate from uncondensed gas, contacting said uncondensed gas with a lean liquid absorbent selected from the group consisting of ethane, ethylene, propane and propylene, from the contacting operation withdrawing a contacted stream of gas having a higher hydrogen concentration than the hydrogen concentration of said charge stock as the main product of the operation, also withdrawing rich liquid absorbent from said operation, fractionating this withdrawn rich liquid absorbent to produce an overhead product comprising methane and a kettle product comprising said lean liquid absorbent, passing at least a portion of said kettle product to the original contacting operation as a portion of the first mentioned lean absorbent, fractionating the separated condensate to produce an overhead product comprising said lean liquid absorbent selected from the group consisting of ethane, ethylene, propane and propylene, and passing this latter overhead product to the contacting operation as another portion of said lean liquid absorbent.

6. A method for concentrating hydrogen comprising chilling a charge stock containing hydrogen and minor amounts of normally gaseous hydrocarbons to a subatmospheric temperature at a superatmospheric pressure to produce condensate, separating said condensate from uncondensed gas, contacting said uncondensed gas with a lean liquid absorbent selected from the group consisting of ethane, ethylene, propane and propylene, at said subatmospheric temperature at said superatmospheric pressure, from this contacting operation withdrawing a contacted stream of gas having a greater hydrogen content than said charge stock as the main product of the operation, also withdrawing rich liquid absorbent from said contacting operation, fractionating this withdrawn rich liqud absorbent at substantally said superatmospheric pressure to produce an overhead product comprising methane and a kettle product comprising said lean liquid absorbent, passing at least a portion of said kettle product to the original contacting step as a portion of the first mentioned lean liquid absorbent, fractionating the above separated condensate to produce an overhead product comprising said lean liquid absorbent selected from the group consisting of ethane, ethylene, propane and propylene, and passing this latter overhead product to said contacting operation as another portion of said lean liquid absorbent.

7. The method of claim 4 wherein the liquid absorbent comprises ethane.

8. In the method of claim 7, carrying out the contacting operation at a pressure of about 5,220 p.s.i. at a temperature of about −120° F.

References Cited in the file of this patent

UNITED STATES PATENTS

| | | |
|---|---|---|
| 1,773,012 | Schuftan | Aug. 12, 1930 |
| 2,355,167 | Keith | Aug. 8, 1944 |
| 2,374,104 | Kirkbride | Apr. 17, 1945 |
| 2,423,156 | Reid | July 1, 1947 |
| 2,468,750 | Gudenrath | May 3, 1949 |
| 2,519,344 | Berg | Aug. 22, 1950 |
| 2,529,312 | Rupp | Nov. 7, 1950 |
| 2,535,148 | Martin | Dec. 26, 1950 |
| 2,573,341 | Kniel | Oct. 30, 1951 |
| 2,603,310 | Gilmore | July 15, 1952 |
| 2,610,704 | Patterson | Sept. 16, 1952 |
| 2,685,941 | Kassel | Aug. 10, 1954 |
| 2,689,624 | Davis | Sept. 21, 1954 |
| 2,720,265 | Tracht | Oct. 11, 1955 |
| 2,743,590 | Grunberg | May 1, 1956 |